(No Model.)

O. J. BROWN.
FLEXIBLE POWER SHAFT.

No. 401,681. Patented Apr. 16, 1889.

Witnesses,

Inventor,
Oscar J. Brown

UNITED STATES PATENT OFFICE.

OSCAR J. BROWN, OF BLACK RIVER FALLS, WISCONSIN.

FLEXIBLE POWER-SHAFT.

SPECIFICATION forming part of Letters Patent No. 401,681, dated April 16, 1889.

Application filed July 17, 1888. Serial No. 280,187. (No model.)

*To all whom it may concern:*

Be it known that I, OSCAR J. BROWN, a resident of Black River Falls, in the county of Jackson and State of Wisconsin, have invented certain new and useful Improvements in Flexible Power-Shafts; and I do hereby declare the following to be a full, clear, and exact description of the invention, such as will enable others skilled in the art to which it pertains to make and use the same.

My invention relates to flexible power-shafts and couplings therefor, and is fully illustrated in the accompanying drawings, wherein—

Figure 1:
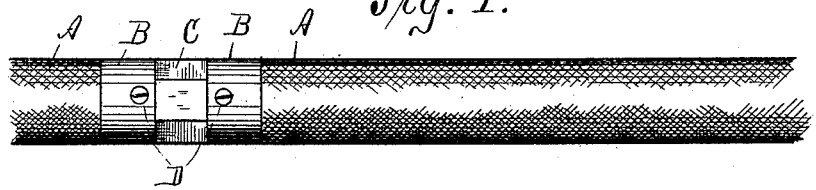
Figure 2:
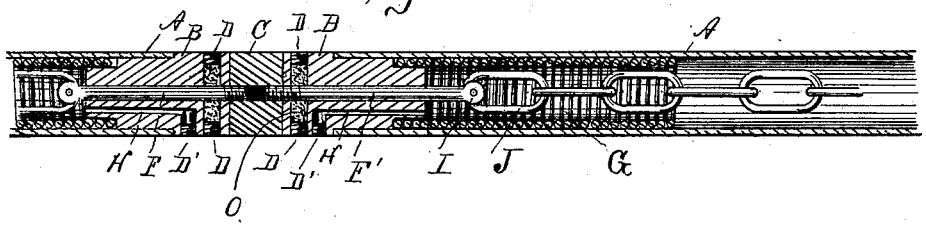
Figure 3:
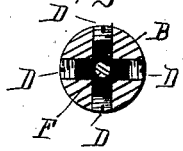

Figure 1 is a view of a portion of the shaft containing a coupling device. Fig. 2 is a central longitudinal section of the same. Fig. 3 is a transverse section at D, Figs. 1 and 2.

In the drawings, J is a chain, of ordinary construction, lying within a helical wire coil, G, which is itself inclosed in a flexible sleeve, A, of leather, rubber, or other suitable material. The shaft is made in sections coupled together successively, and as the two ends of each section are similar only the adjacent ends of two coupled sections are shown. Each section terminates in a steel block, B, preferably equal in diameter to the outer sleeve, A, which fits closely over a diminished portion of the block, where it is secured in any suitable manner. The coil G is secured upon a still further diminished portion of the block, and we have thus a flexible metal-lined tube closed at each end. To the end links of the chain lying within this tube rods F F' are attached in such manner that they must rotate with the chain. As shown, the end of each rod is bifurcated, slipped over the end of the link, and secured by a rivet, I, passing through the two ends and within the link. Each rod passes axially through the corresponding block, B, and by means of a screw-thread upon its end is firmly secured in a block, C, preferably of the same diameter as the blocks B, and whose end faces, like those of the blocks B, are perpendicular to the rods F F'. Now, as the rods F F' are fixed in the same block, C, and rotate freely in the blocks B, it follows that torsional force applied to the chain at any point will be transmitted from section to section throughout the length of the shaft, the sleeves A G and blocks B remaining stationary and the blocks C rotating with the rods F F'. In this transmission the successive links have the same motion as if connected by universal joints whenever the shaft is deflected from a straight line. Were the chain free to shorten and to deflect, it would "kink;" but owing to the lateral resistance of the coil, which prevents short bends, and to the incompressible nature of a closely-wound coil, kinking cannot occur.

To prevent friction of the links upon each other and upon the coil, the shaft-sections may be partially or entirely filled with oil or other lubricant introduced through channels H, whose external openings through the surface of the blocks B are closed by screw-plugs D.

To prevent the escape of oil about the rods F F', apertures a little greater in diameter than the rods are drilled in the same transverse plane at intervals of ninety degrees about the circumference of the blocks B, and in these apertures is placed suitable packing, O. The apertures are then closed by screw-plugs D, which press the packing around the whole circumference of the rods.

I have shown an ordinary chain as the simplest form of flexible shaft; but I do not desire to limit myself to this construction, since evidently the successive links may be connected by other forms of universal joints without departing from my invention. It is also plain that the ends of the rods F F' may be prevented from turning in the block C by other means than screwing their ends firmly in position with threads cut to advance in the direction of the shaft's rotation.

What I claim is—

1. In a sectional flexible shaft, a series of coupled sections, each composed of an axial power-transmitting chain consisting of universally-joined links, a wire coil inclosing said chain, a flexible sleeve enveloping said coil, metallic blocks secured to both said sleeve and coil in the ends thereof, and rods attached to and rotating with the end links, respectively, of said chain and passing axially through said blocks.

2. In a flexible shaft, the combination, with two stationary sections having a rotary rod projecting axially from their adjacent ends, of a block interposed between said ends, engaging both said rods and rotating therewith, whereby power may be transmitted from one section to the other.

3. The combination, with the power-transmitting chain J and its inclosing-sleeve A G, of the blocks B, provided with the oil-ducts H and the packing-chambers O, closing the ends of said sleeves, and the rods F F', connected to said chain and projecting through said blocks, substantially as set forth.

In testimony whereof I have signed this specification in the presence of two subscribing witnesses.

OSCAR J. BROWN.

Witnesses:
W. S. DWINNELL,
L. L. MORRILL.